United States Patent
Kim et al.

(10) Patent No.: US 9,218,908 B2
(45) Date of Patent: Dec. 22, 2015

(54) MULTILAYER CERAMIC ELECTRONIC COMPONENT CAPABLE OF REDUCING ACOUSTIC NOISE GENERATED THEREIN

(71) Applicant: SAMSUNG ELECTRO-MECHANICS CO., LTD., Suwon, Gyunggi-eo (KR)

(72) Inventors: Wi Heon Kim, Gyunggi-do (KR); Doo Young Kim, Gyunggi-do (KR); Jae Yeol Choi, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 100 days.

(21) Appl. No.: 13/759,630

(22) Filed: Feb. 5, 2013

(65) Prior Publication Data

US 2014/0160620 A1 Jun. 12, 2014

(30) Foreign Application Priority Data

Dec. 12, 2012 (KR) ......................... 10-2012-0144137

(51) Int. Cl.
*H01G 4/30* (2006.01)
*H01G 4/012* (2006.01)
*H01G 4/232* (2006.01)
*H01G 4/12* (2006.01)

(52) U.S. Cl.
CPC ............... *H01G 4/30* (2013.01); *H01G 4/012* (2013.01); *H01G 4/232* (2013.01); *H01G 4/12* (2013.01)

(58) Field of Classification Search
CPC ........... H01G 4/30; H01G 4/12; H01G 4/005; H01G 4/012; H01G 4/232
USPC ................................. 361/303, 321.2
See application file for complete search history.

(56) References Cited

U.S. PATENT DOCUMENTS

| | | | | |
|---|---|---|---|---|
| 7,054,134 | B2 * | 5/2006 | Togashi et al. | 361/301.4 |
| 7,414,857 | B2 * | 8/2008 | Ritter et al. | 361/756 |
| 2008/0144253 | A1 * | 6/2008 | Togashi | 361/301.4 |
| 2009/0154055 | A1 * | 6/2009 | Takashima et al. | 361/301.4 |
| 2010/0128413 | A1 * | 5/2010 | Takashima et al. | 361/306.3 |
| 2010/0206624 | A1 * | 8/2010 | Feichtinger | 174/260 |

FOREIGN PATENT DOCUMENTS

| | | | |
|---|---|---|---|
| JP | 2006-013245 | A | 1/2006 |
| JP | 2006-086359 | A | 3/2006 |
| JP | 2008-258481 | A | 10/2008 |
| JP | 2009-026872 | A | 2/2009 |
| JP | 2009-054973 | A | 3/2009 |

OTHER PUBLICATIONS

Japanese Office Action issued in Appliction No. 2013-014055 dated Nov. 26, 2014.

* cited by examiner

*Primary Examiner* — David M Sinclair
(74) *Attorney, Agent, or Firm* — McDermott Will & Emery LLP

(57) ABSTRACT

There is provided a multilayer ceramic electronic component, including: a ceramic body having first and second main surfaces, first and second side surfaces, and first and second end surfaces; a first block including first and second internal electrodes having overlap regions which form a capacitance part; one or more second blocks each including third and fourth internal electrodes having overlap regions which form a capacitance part; a first external electrode connected to the first and third lead out portions and a second external electrode connected to the second and fourth lead out portions; and an insulating layer formed on the first side surface of the ceramic body, wherein the second blocks are disposed on upper and lower parts of the first block.

25 Claims, 8 Drawing Sheets

MULTILAYER CERAMIC ELECTRONIC COMPONENT CAPABLE OF REDUCING ACOUSTIC NOISE GENERATED THEREIN

CROSS-REFERENCE TO RELATED APPLICATIONS

This application claims the priority of Korean Patent Application No. 10-2012-0144137 filed on Dec. 12, 2012, in the Korean Intellectual Property Office, the disclosure of which is incorporated herein by reference.

BACKGROUND OF THE INVENTION

1. Field of the Invention

The present invention relates a multilayer ceramic electronic component capable of preventing a short circuit occurring between internal electrodes and reducing acoustic noise generated in multilayer ceramic electronic components during the application of voltage.

2. Description of the Related Art

A capacitor, an inductor, a piezoelectric element, a varistor, a thermistor, and the like, are representative electronic components using a ceramic material.

Among these ceramic electronic components, a multilayer ceramic capacitor (MLCC) has a small size, is able to secure a high degree of capacitance, and has ease of mountability.

This multilayer ceramic capacitor is a chip type condenser performing a main function of charging or discharging electricity while it is mounted on a circuit board of several types of electronic product, such as a computer, a personal digital assistant (PDA), a cellular phone, or the like. The multilayer ceramic capacitor has several sizes and lamination types, depending on the intended usage and required capacitance thereof.

In particular, as the trend has been for electronic products to be reduced in size, ultra-miniaturization and the implementation of ultra-high capacitance in multi-layer ceramic capacitors have also been required.

For this reason, a multi-layer ceramic capacitor in which dielectric layers and internal electrodes are thinly formed for ultra-miniaturization of products and in which a large number of dielectric layers are laminated for the ultra-high capacitance thereof has been manufactured.

Meanwhile, there is provided a multilayer ceramic capacitor in which all external electrodes are positioned on a lower surface. In this structure of a multilayer ceramic capacitor, mounting density and capacitance thereof are excellent and ESL is low, but a short circuit between internal electrodes may easily occur due to a phenomenon in which facing internal electrodes are pushed by cutting stress at the time of cutting the ceramic body.

RELATED ART DOCUMENT

Japanese Patent Laid-Open Publication No. 2006-086359

SUMMARY OF THE INVENTION

An aspect of the present invention provides a multilayer ceramic electronic component capable of preventing a short circuit occurring between internal electrodes and reducing acoustic noise generated in a multilayer ceramic electronic component during the application of voltage thereto.

According to an aspect of the present invention, there is provided a multilayer ceramic electronic component, including: a ceramic body including dielectric layers, and having first and second main surfaces opposing each other, first and second side surfaces opposing each other, and first and second end surfaces opposing each other; a first block including first and second internal electrodes having overlap regions which form a capacitance part for forming capacitance inside the ceramic body while the overlap regions are exposed to the first side surface, each of the first internal electrodes having a first lead out portion extended from the capacitance part so as to be exposed to the first side surface, the second internal electrodes being laminated alternately with the first internal electrodes having the dielectric layers interposed therebetween while being insulated from the first internal electrodes, each of the second internal electrodes having a second lead out portion extended from the capacitance part so as to be exposed to the first side surface; one or more second blocks each including third and fourth internal electrodes having overlap regions which form a capacitance part for forming capacitance inside the ceramic body, each of the third internal electrodes having a third lead out portion extended from the capacitance part so as to be exposed to the first side surface, the fourth internal electrodes being laminated alternately with the third internal electrodes having the dielectric layers interposed therebetween while being insulated from the third internal electrodes, each of the fourth internal electrodes having a fourth lead out portion extended from the capacitance part so as to be exposed to the first side surface; a first external electrode connected to the first and third lead out portions and a second external electrode connected to the second and fourth lead out portions; and an insulating layer formed on the first side surface of the ceramic body, wherein the second blocks are disposed above and below the first block.

Here, a thickness of the first block may be 20 to 80% of an overall thickness of the first and second blocks in a cross section taken in length-thickness directions of the ceramic body.

Here, a thickness of the second block may be 10 to 40% based on an overall thickness of the first and second blocks in a cross section taken in length-thickness directions of the ceramic body.

The first to fourth internal electrodes may be disposed vertically with respect to a mounting surface of the ceramic body.

The first external electrode may be extended to at least one of the first main surface, the second main surface, and the second side surface of the ceramic body.

The second external electrode may be extended to at least one of the first main surface, the second main surface, and the second side surface of the ceramic body.

The insulating layer may contain at least one selected from the group consisting of epoxy, a heat-resistant polymer, glass, and a ceramic material.

The insulating layer may cover all exposed portions of the first and second internal electrodes.

The insulating layer may be lower than a height of the first and second external electrodes, measured from the first side surface of the ceramic body.

According to another aspect of the present invention, there is provided a multilayer ceramic electronic component, including: a ceramic body including dielectric layers, and having first and second main surfaces opposing each other, first and second side surfaces opposing each other, and first and second end surfaces opposing each other; a first block including first and second internal electrodes having overlap regions which form a capacitance part for forming capacitance inside the ceramic body while the overlap regions are exposed to the first and second side surfaces, each of the first internal electrodes having a first lead out portion extended from the capacitance part so as to be exposed to the first and second side surfaces, the second internal electrodes being laminated alternately with the first internal electrodes having the dielectric layers interposed therebetween while being insulated from the first internal electrodes, each of the second internal electrodes having a second lead out portion extended from the capacitance part so as to be exposed to the first and second side surfaces; one or more second blocks each including third and fourth internal electrodes having overlap regions which form a capacitance part for forming capacitance inside the ceramic body, each of the third internal electrodes having a third lead out portion extended from the capacitance part so as to be exposed to the first and second side surfaces, the fourth internal electrodes being laminated alternately with the third internal electrodes having the dielectric layers interposed therebetween while being insulated from the third internal electrodes, each of the fourth internal electrodes having a fourth lead out portion extended from the capacitance part so as to be exposed to the first and second side surfaces; a first external electrode connected to the first and third lead out portions and a second external electrode connected to the second and fourth lead out portions; and an insulating layer formed on the first and second side surfaces of the ceramic body, wherein the second blocks are disposed above and below the first block.

Here, a thickness of the first block may be 20 to 80% of an overall thickness of the first and second blocks in a cross section taken in length-thickness directions of the ceramic body.

Here, a thickness of the second block may be 10 to 40% based on an overall thickness of the first and second blocks in a cross section taken in length-thickness directions of the ceramic body.

The first and second internal electrodes may be disposed vertically with respect to a mounting surface of the ceramic body.

The first external electrode may be extended to at least one of the first main surface, the second main surface, and the first end surface of the ceramic body.

The second external electrode may be extended to at least one of the first main surface, the second main surface, and the second end surface of the ceramic body.

The insulating layer may contain at least one selected from the group consisting of epoxy, a heat-resistant polymer, glass, and a ceramic.

The insulating layer may cover all exposed portions of the first and second internal electrodes.

The insulating layer may be lower than a height of the first and second external electrodes, measured from the first or second side surface of the ceramic body.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
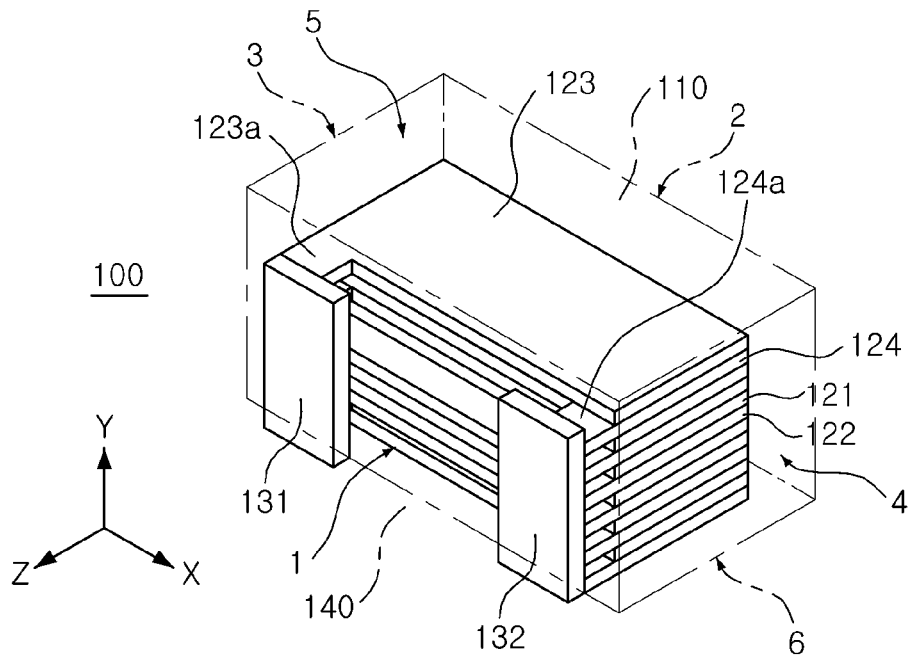
FIG. 1 is a perspective view showing a schematic structure of a multilayer ceramic capacitor according to one embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

FIG. 1 is a perspective view showing a schematic structure of a multilayer ceramic capacitor according to one embodiment of the present invention.

Figure 2:
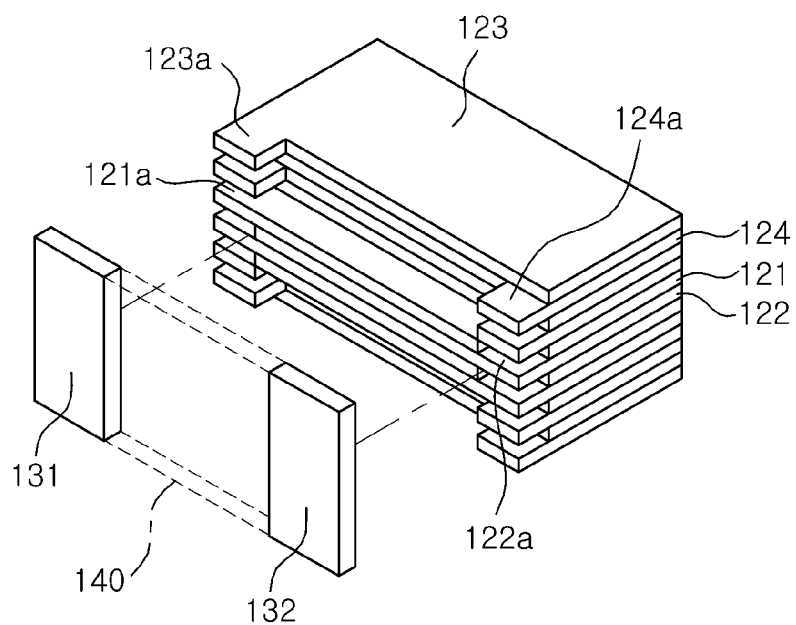
FIG. 2 is an exploded perspective view of FIG. 1.

FIG. 2 is an exploded perspective view of FIG. 1.

Figure 3:
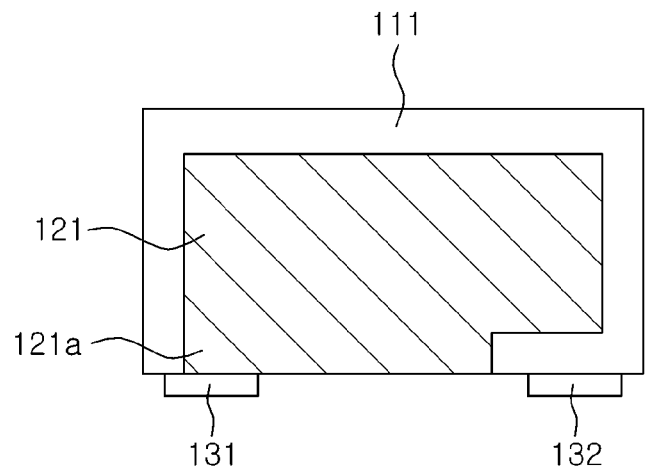
FIG. 3 is a cross-sectional view showing a combination structure of a first internal electrode and a first external electrode of FIG. 1.

FIG. 3 is a cross-sectional view showing a combination structure of a first internal electrode and a first external electrode of FIG. 1.

Figure 4:
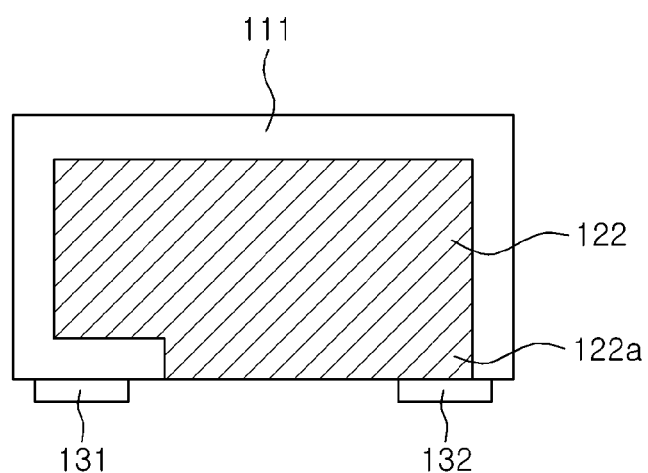
FIG. 4 is a cross-sectional view showing a combination structure of a second internal electrode and a second external electrode of FIG. 1.

FIG. 4 is a cross-sectional view showing a combination structure of a second internal electrode and a second external electrode, of FIG. 1.

Figure 5:
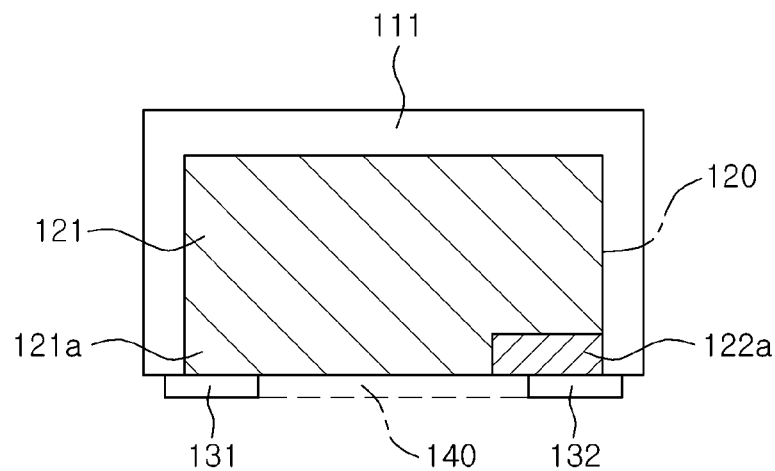
FIG. 5 is a cross-sectional view showing a combination structure of the first and second internal electrodes and the first and second external electrodes of FIG. 1.

FIG. 5 is a cross-sectional view showing a combination structure of the first and second internal electrodes and the first and second external electrodes of FIG. 1.

Figure 6:
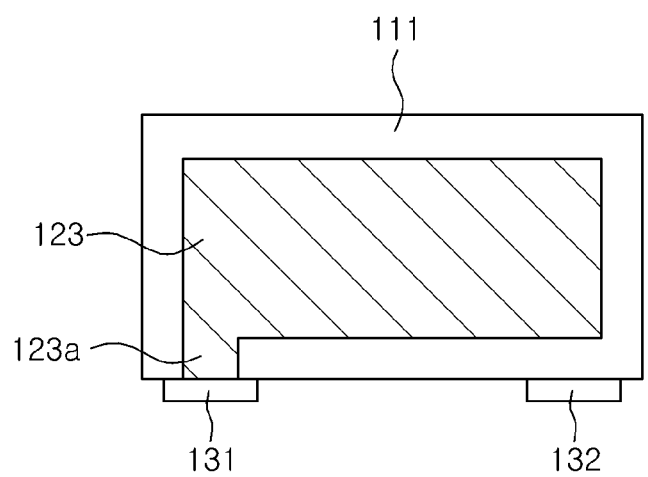
FIG. 6 is a cross-sectional view showing a combination structure of a third internal electrode and the first external electrode of FIG. 1.

FIG. 6 is a cross-sectional view showing a combination structure of a third internal electrode and the first external electrode of FIG. 1.

Figure 7:
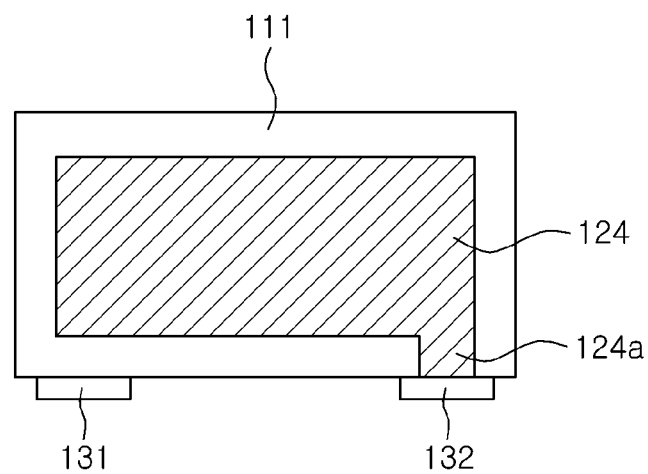
FIG. 7 is a cross-sectional view showing a combination structure of a fourth internal electrode and the second external electrode of FIG. 1.

FIG. 7 is a cross-sectional view showing a combination structure of a fourth internal electrode and the second external electrode of FIG. 1.

Figure 8:
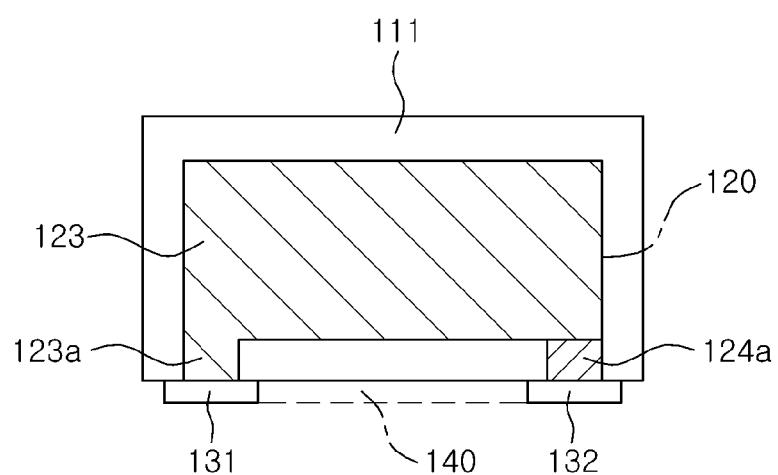
FIG. 8 is a cross-sectional view showing a combination structure of the third and fourth internal electrodes and the first and second external electrodes of FIG. 1.

FIG. 8 is a cross-sectional view showing a combination structure of the third and fourth internal electrodes and the first and second external electrodes of FIG. 1.

Figure 9:
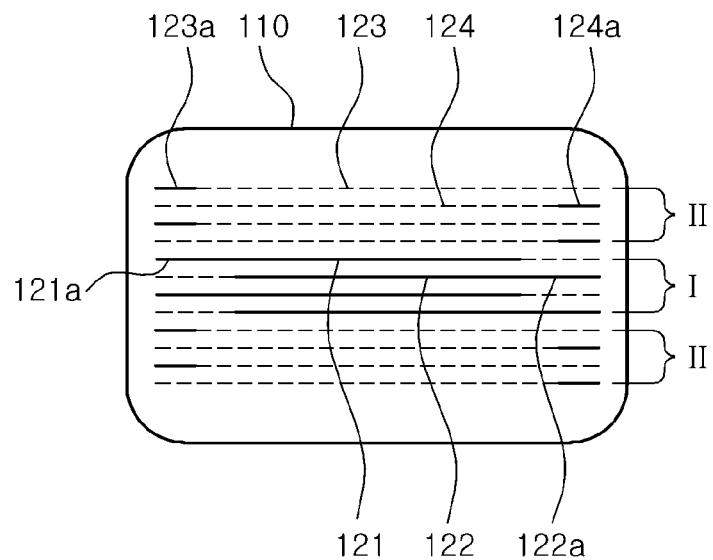
FIG. 9 is a schematic view showing an inner structure of the multilayer ceramic capacitor of FIG. 1, seen from a first side surface.

FIG. 9 is a schematic view showing an inner structure of the multilayer ceramic capacitor of FIG. 1 seen from a first side surface.

The multilayer ceramic capacitor of the present embodiment may be a 2-terminal vertically laminated or vertical multilayer capacitor. The term "vertically laminated or vertical multilayer" refers that internal electrodes laminated in the capacitor are disposed vertically with respect to a surface of a mounting area of a circuit board. The term "2-terminal" refers that two terminals as terminals of the capacitor are connected to the circuit board.

Referring to FIGS. 1 through 9, a multilayer ceramic capacitor 100 according to an embodiment of the invention may include: a ceramic body 110; internal electrodes 121, 122, 123, and 124 formed inside the ceramic body 110; an insulating layer 140 formed on one surface of the ceramic body 110; and external electrodes 131 and 132.

In the present embodiment, the ceramic body 110 may have first and second main surfaces 5 and 6 facing each other, and a first side surface 1, a second side surface 2, a first end surface 3, and a second end surface 4 connecting the first and second main surfaces 5 and 6 to each other. The shape of the ceramic body 110 is not particularly limited, but as shown in the drawings, may be a rectangular parallelepiped shape. According to the embodiment of the invention, the first side surface 1 of the ceramic body may be a mounting surface, disposed on a mounting area of a circuit board.

According to the embodiment of the invention, an x-direction may be a direction in which the first and second external electrodes are formed at a predetermined interval, a y-direction may be a direction in which the internal electrodes are laminated with dielectric layer therebetween, and a z-direction may be a direction in which the internal electrodes are mounted on the circuit board.

According to the embodiment of the invention, the ceramic body 110 may be formed by laminating a plurality of dielectric layers 111. The plurality of dielectric layers 111 constituting the ceramic body 110 is in a sintered state, and may be integrated with each other so as not to distinguish boundaries between neighboring dielectric layers.

The dielectric layer 111 may be formed by firing a ceramic green sheet containing a ceramic powder, an organic solvent, and an organic binder. The ceramic powder is a material having a high dielectric constant, and a barium titanate (BaTiO$_3$) based material, a strontium titanate (SrTiO$_3$) based material, or the like, may be used, but the ceramic powder is not limited thereto.

According to the embodiment of the invention, the internal electrodes may be formed inside the ceramic body 110.

Referring to FIGS. 3 through 5, the first internal electrode 121 having first polarity and the second internal electrode 122 having second polarity, and, the third internal electrode 123 having first polarity and the fourth internal electrode 124 having second polarity, may become each pair, respectively, and may be disposed in the y-direction to face each other with one dielectric layer 111 therebetween.

According to the embodiment of the present invention, the first to fourth internal electrodes 121, 122, 123, and 124 may be disposed vertically with respect to the mounting surface, that is, the first side surface 1, of the multilayer ceramic capacitor.

In the present embodiment, the first and second polarities may refer to different polarities.

According to the embodiment of the present invention, the first to fourth internal electrodes 121, 122, 123, and 124 may be formed of a conductive paste containing a conductive metal.

The conductive metal may be, but is not limited to, Ni, Cu, Pd, or an alloy thereof.

Each of the internal electrode layers may be printed on a ceramic green sheet for forming the dielectric layer by using a conductive paste through a printing method such as a screen printing method or a gravure printing method.

The ceramic green sheets having the internal electrode layer printed thereon may be alternately laminated and fired, to thereby form the ceramic body.

The multilayer ceramic capacitor 100 according to the embodiment of the invention electronic component may include a first block (I) and one or more second blocks (II). The first block (I) may include the first and second internal electrodes 121 and 122 having overlap regions which form a capacitance part 120 for forming capacitance inside the ceramic body 110 while the overlap regions are exposed to the first side surface 1, the first internal electrodes 121 respectively having a first lead out portion 121a extended from the capacitance part 120 so as to be exposed to the first side surface 1, the second internal electrodes 122 being laminated alternately with the first internal electrodes 121 with the dielectric layers 111 therebetween while being insulated from the first internal electrodes 121, the second internal electrodes 122 respectively having a second lead out portion 122a extended from the capacitance part 120 so as to be exposed to the first side surface 1. The second block (II) may include third and fourth internal electrodes 123 and 124 having overlap regions which form a capacitance part 120 for forming capacitance inside the ceramic body 110, the third internal electrodes 123 respectively having a third lead out portion 123a extended from the capacitance part 120 so as to be exposed to the first side surface 1, the fourth internal electrodes 124 being laminated alternately with the third internal electrodes 123 with the dielectric layers 111 therebetween while being insulated from the third internal electrodes 123, and the fourth internal electrodes 124 respectively having a fourth lead out portion 124a extended from the capacitance part 120 so as to be exposed to the first side surface 1.

The second blocks (II) may be disposed on upper and lower parts of the first block (I), but are not limited thereto.

Hereinafter, the first block (I) and the second block (II) will be described in detail, and then the relationship between the first block (I) and the second block (II) will be described in detail.

The first block (I) may include the first and second internal electrodes 121 and 122 having overlap regions forming the capacitance part 120 for forming capacitance inside the ceramic body 110 while the overlap regions are exposed to the first side surface 1, each of the first internal electrodes 121 having the first lead out portion 121a extended from the capacitance part 120 so as to be exposed to the first side surface 1, the second internal electrodes 122 being laminated alternately with the first internal electrodes 121 with the dielectric layer 111 therebetween while being insulated from the first internal electrodes 121, each of the second internal electrodes 122 having the second lead out portion 122a extended from the capacitance part 120 so as to be exposed to the first side surfaces 1.

The first and second internal electrodes 121 and 122 have first and second lead out portions 121a and 122a, so as to be connected with the external electrodes having different polarities, respectively. The first and second lead out portions 121a and 122a may be exposed to the first side surface 1 of the ceramic body 110.

According to the embodiment of the invention, the multilayer ceramic capacitor is a vertically laminated or vertical multilayer capacitor, and the first and second lead out portions 121a and 122a may be exposed to the same surface of the ceramic body 110.

According to the embodiment of the invention, the lead out portion of the internal electrode may refer to a region of which a conductor pattern forming the internal electrode has an increased width to be exposed to one surface of the ceramic body.

The first and second internal electrodes 121 and 122 form a capacitance by the overlap regions thereof, and the first and second lead out portions 121a and 122a connected with the external electrodes having different polarities do not have overlap regions.

Since the overlap regions forming the capacitance part 120 is exposed to the first side surface 1 as described above, the route for removing residual carbon may be further secured in the firing of the ceramic body.

This may further improve continuity of the internal electrode, and thus increase the capacitance of the multilayer ceramic capacitor.

In addition, the area of the capacitance part 120 is increased, and thus the capacitance of the multilayer ceramic capacitor may be increased.

The second block (II) may include the third and fourth internal electrodes 123 and 124 having overlap regions forming the capacitance part 120 for forming capacitance inside the ceramic body 110, each of the third internal electrodes 123 having the third lead out portion 123a extended from the capacitance part 120 to be exposed to the first side surface 1, the fourth internal electrodes 124 being laminated alternately with the third internal electrodes 123 with the dielectric layer 111 therebetween while being insulated from the third internal electrodes 123, and each of the fourth internal electrodes 124 having the fourth lead out portion 124a extended from the capacitance part 120 to be exposed to the first side surfaces 1.

The third and fourth internal electrodes 123 and 124 have the third and fourth lead out portions 123a and 124a, so as to be connected to the external electrodes having different polarities, respectively. The third and fourth lead out portions 123a and 124a may be exposed to the first side surface 1 of the ceramic body 110.

According to the embodiment of the present invention, the multilayer ceramic capacitor is a vertically laminated or vertical multilayer capacitor, and the third and fourth lead out portions 123a and 124a may be exposed to the same surface of the ceramic body 110.

The third and fourth internal electrodes 123 and 124 form a capacitance by the overlap regions thereof, and the third and forth lead out portions 123a and 124a connected to the external electrodes having different polarities do not have overlap regions.

Since the third and fourth lead out portions 123a and 124a are insulated from each other without overlapping as described above, short circuits occurring between internal electrodes due to a phenomenon that opposing internal electrodes are pushed by cutting stress at the time of cutting the ceramic body may be prevented.

According to the embodiment of the present invention, the second blocks (II) may be disposed on the upper and lower parts of the first block (I).

The first block (I) is disposed in a center area of the ceramic body 110, and the second blocks (II) are disposed above and below the first block (I), so that capacitance of the multilayer ceramic capacitor may be increased by the first block (I) and the short circuits occurring between internal electrodes may be improved by the second blocks (II).

In addition, the capacitance parts 120 of the third and fourth internal electrodes 123 and 124 included in the second block (II) are not exposed to the first side surface of the ceramic body 110, and thus, in the case in which the insulating layer 140 is formed on the first side surface 1 as described below, deterioration of reliability due to defective coating may be prevented.

That is, the insulating layer 140 is generally formed in order to shut off the internal electrodes exposed to the first side surface 1 from an outside, but at the time of forming the insulating layer, four edge portions of the first side surface 1 may be incompletely sealed by the insulating layer 140.

In this case, reliability may be deteriorated, that is, such as deterioration in moisture resistance, due to the incompletely sealed four edge portions of the first side surface 1.

According to the embodiment of the present invention, the second blocks (II) of which the capacitance part 120 is not exposed to the first side surface of the ceramic body 110 is disposed above and below the first block (I), as described above, and thus reliability may not be deteriorated even in the case in which the four edge portions of the first side surface 1 are incompletely sealed.

Therefore, according to the embodiment of the present invention, since the second blocks (II) are disposed above and below the first block (I), the capacitance of the multilayer ceramic capacitor may be increased, the short circuits occurring between the internal electrodes may be prevented and the deterioration in reliability due to deterioration in moisture resistance may be prevented.

Referring to FIGS. 3 through 5, the first external electrode 131 may be connected to the first lead out portion 121a of the first internal electrode 121 drawn to the first side surface 1 of the ceramic body 110 and the second external electrode 132 may be connected to the second lead out portion 122a of the second internal electrode 122 drawn to the first side surface 1 of the ceramic body 110.

Referring to FIGS. 6 through 8, the first external electrode 131 may be connected to the third lead out portion 123a of the third internal electrode 123 drawn to the first side surface 1 of the ceramic body 110 and the second external electrode 132 may be connected to the fourth lead out portion 124a of the fourth internal electrode 124 drawn to the first side surface 1 of the ceramic body 110.

That is, the first external electrode 131 may be connected to the first and third lead out portions 121a and 123a, and the second external electrode 132 may be connected to the second and fourth lead out portions 122a and 124a.

The first external electrode 131 is formed on the first side surface 1 of the ceramic body 110 in order to be connected to the first and third lead out portions 121a and 123a, and may be extended to the first end surface 3 of the ceramic body 110, but is not limited thereto.

In addition, the second external electrode 132 is formed on the first side surface 1 of the ceramic body 110 in order to be connected to the second and fourth lead out portions 122a and 124a, and may be extended to the second end surface 4 of the ceramic body 110, but is not limited thereto.

That is, the first external electrode 131 may be extended to one or more of the first main surface 5, the second main surface 6, and the second side surface 2 of the ceramic body 110.

In addition, the second external electrode 132 may be extended to one or more of the first main surface 5, the second main surface 6, and the second side surface 2 of the ceramic body 110.

Therefore, according to the embodiment of the invention, the first external electrode 131 may be connected to the first and third lead out portions 121a and 123a of the first and third internal electrodes 121 and 123, which are drawn to the first side surface 1 of the ceramic body 110, and may surround one end part in a length direction of the ceramic body 110.

In addition, the second external electrode 132 may be connected to the second and fourth lead out portions 122a and 124a of the second and fourth internal electrodes 122 and 124, which are drawn to the first side surface 1 of the ceramic body 110, and may surround the other end part in the length direction of the ceramic body 110.

The first and second external electrodes 131 and 132 may be formed of a conductive paste containing a conductive metal.

The conductive metal may be, but is not limited to, Ni, Cu, Sn, or an alloy thereof.

The conductive paste may further contain an insulating material, but is not limited thereto. For example, the insulating material may be glass.

A method of forming the first and second external electrodes 131 and 132 is not particularly limited. The first and second external electrodes 131 and 132 may be formed by dipping the ceramic body, or by using the other methods such as plating and the like.

Meanwhile, according to the embodiment of the invention, the insulating layer 140 may be formed on the first side surface 1 of the ceramic body 110, as shown in FIGS. 5 and 8.

The insulating layer 140 may be formed between the first and second external electrodes 131 and 132.

The insulating layer 140 may cover all the overlap regions of the first and second internal electrodes 121 and 122 exposed to the first side surface.

According to the embodiment of the present invention, as shown in FIG. 5, the insulating layer 140 may completely fill one surface of the ceramic body 110 between the first and second external electrodes 131 and 132.

In addition, although not shown, according to the embodiment of the invention, the insulating layer 140 may cover only the overlap regions of the first and second internal electrodes 121 and 122 while having a predetermined space from the first and second external electrodes 131 and 132.

According to the embodiment of the invention, the height of the insulating layer 140 may be smaller than the height of the first external electrode 131 or the second external electrode 132. The heights of the insulating layer and the first and second external electrodes may be measured based on the mounting surface, that is, the first side surface.

According to the present embodiment, since the height of the insulating layer is smaller than the height of the first and second external electrodes, the multilayer ceramic capacitor 100 may be mounted on the circuit board with more stability.

In addition, the first and second external electrodes 131 and 132 may be formed on a portion of the first side surface of the ceramic body 110.

The insulating layer 140 may be formed of at least one selected from the group consisting of epoxy, heat-resistant polymer, glass, and ceramic material, but is not particularly limited thereto.

According to the embodiment of the invention, the insulating layer 140 may be made of a ceramic slurry.

The position and height of the insulating layer 140 may be controlled by adjusting the amount and shape of the ceramic slurry.

The insulating layer 140 may be formed by forming the ceramic body through a burning process, and then printing the ceramic slurry on the ceramic body, followed by burning.

Alternatively, the insulating layer 140 may be formed by applying a ceramic slurry for forming the insulating layer on a ceramic green sheet constituting the ceramic body and then firing the ceramic slurry together with the ceramic green sheet.

A method of applying the ceramic slurry is not particularly limited. For example, the ceramic slurry may be sprayed by a spray method or may be printed by using a roller.

The insulating layer 140 covers the overlap regions of the first and second internal electrodes 121 and 123, which are exposed to one surface of the ceramic body, so that a short-circuit between the internal electrodes may be prevented and an internal defect such as deterioration in humidity-resistant characteristics, or the like, may be prevented.

Referring to FIG. 9, it may be seen that the first and second internal electrodes 121 and 122 are alternately exposed to the first side surface 1 of the ceramic body 110.

In addition, it may be seen that the third and fourth internal electrodes 123 and 124 excluding the third and fourth lead out portions may not be exposed to the first side surface 1 of the ceramic body 110.

Referring to FIG. 9, the thickness of the first block (I) may be 20 to 80% the overall thickness of the first and second blocks, on a cross section in a length-thickness (L-T) direction of the ceramic body 110.

The thickness of the second block (II) may be 10 to 40% the overall thickness of the first and second blocks, on the cross section in the length-thickness (L-T) direction of the ceramic body 110.

As described above, the thickness of the first block (I) may be 20 to 80% the overall thickness of the first and second blocks and the second block (II) may be 10 to 40% the overall thickness of the first and second blocks, thereby increasing capacitance of the multilayer ceramic capacitor, preventing the short circuits occurring between the internal electrodes, and preventing the deterioration in reliability due to deterioration in moisture resistance.

If the thickness of the first block (I) is below 20% the overall thickness of the first and second blocks, the overlap regions of the first and second internal electrodes 121 and 122, which are exposed to the first side surface of the ceramic body 110, are small, resulting in reducing the capacitance part 120 and failing to sufficiently secure the route for residual carbon, and thus the effect of increasing the capacitance may be little.

If the thickness of the first block (I) is above 80% the overall thickness of the first and second blocks, the overlap regions of the first and second internal electrodes 121 and 122, which are exposed to the first side surface of the ceramic body 110, are increased in a thickness direction of the ceramic body, and thus there may be risk of a short defect.

Figure 10:
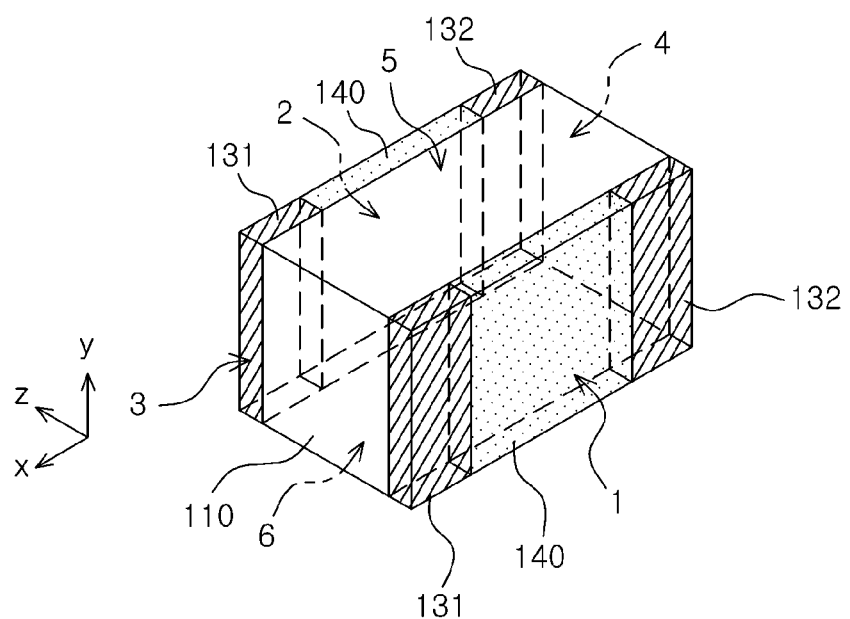
FIG. 10 is a perspective view showing a schematic structure of a multilayer ceramic capacitor according to another embodiment of the present invention.

FIG. 10 is a perspective view showing a schematic structure of a multilayer ceramic capacitor according to another embodiment of the present invention.

Figure 11:
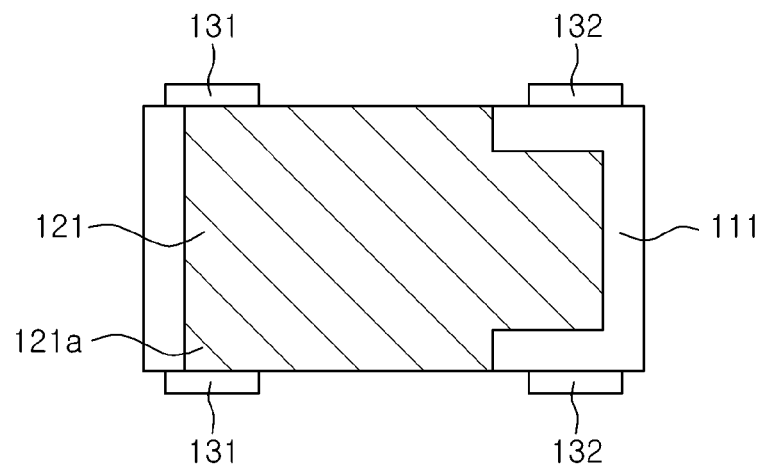
FIG. 11 is a cross-sectional view showing a combination structure of a first internal electrode and a first external electrode of FIG. 10.

FIG. 11 is a cross-sectional view showing a combination structure of a first internal electrode and a first external electrode of FIG. 10.

Figure 12:
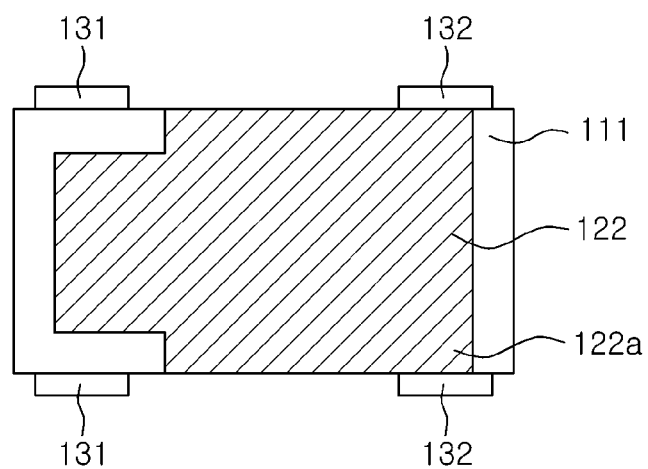
FIG. 12 is a cross-sectional view showing a combination structure of a second internal electrode and a second external electrode, of FIG. 10.

FIG. 12 is a cross-sectional view showing a combination structure of a second internal electrode and a second external electrode, of FIG. 10.

Figure 13:
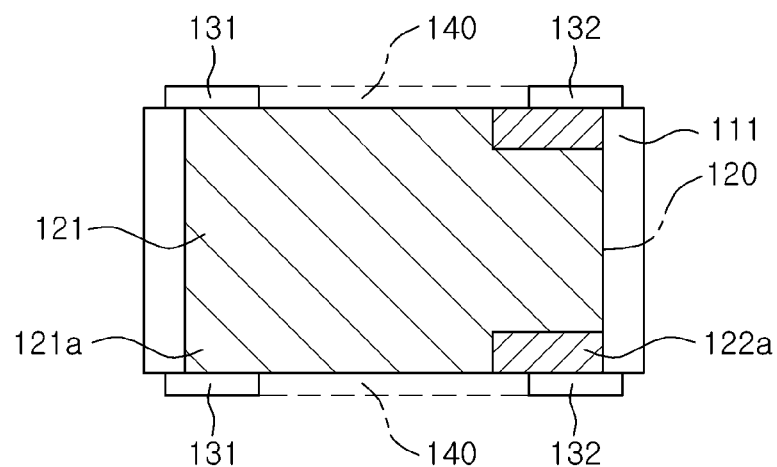
FIG. 13 is a cross-sectional view showing a combination structure of the first and second internal electrodes and the first and second external electrodes of FIG. 10.

FIG. 13 is a cross-sectional view showing a combination structure of the first and second internal electrodes and the first and second external electrodes of FIG. 10.

Figure 14:
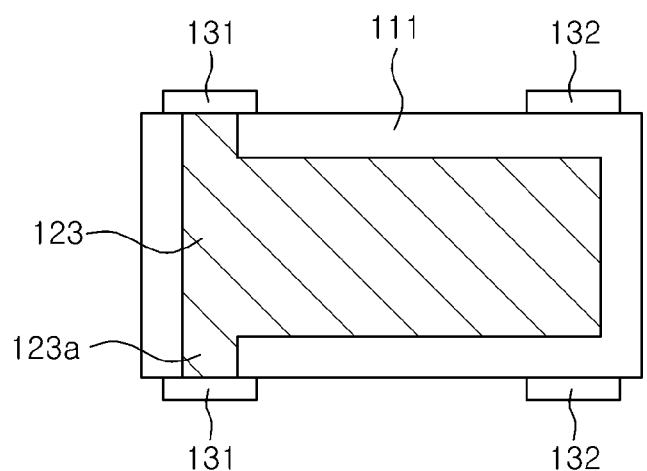
FIG. 14 is a cross-sectional view showing a combination structure of a third internal electrode and the first external electrode of FIG. 10.

FIG. 14 is a cross-sectional view showing a combination structure of a third internal electrode and the first external electrode of FIG. 10.

Figure 15:
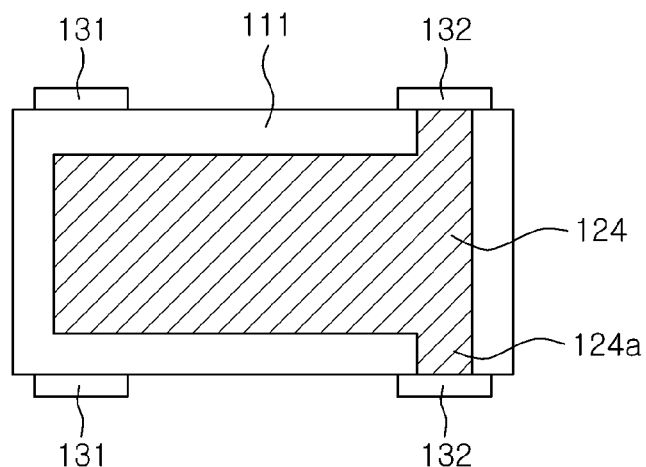
FIG. 15 is a cross-sectional view showing a combination structure of a fourth internal electrode and the second external electrode of FIG. 10.

FIG. 15 is a cross-sectional view showing a combination structure of a fourth internal electrode and the second external electrode of FIG. 10.

Figure 16:
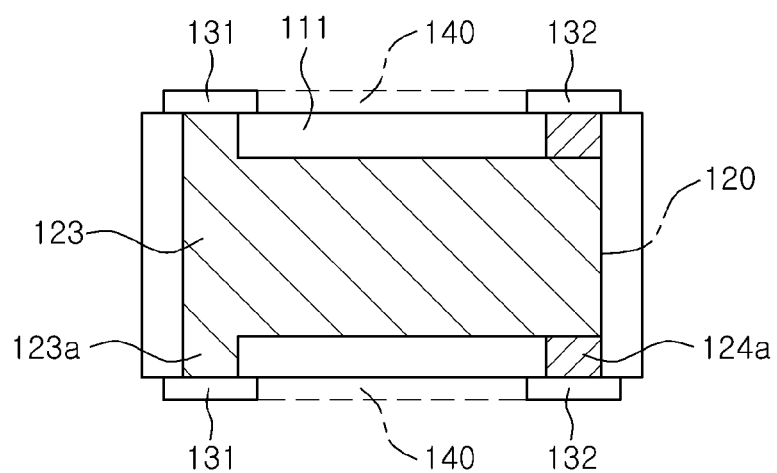
FIG. 16 is a cross-sectional view showing a combination structure of the third and fourth internal electrodes and the first and second external electrodes of FIG. 10.

FIG. 16 is a cross-sectional view showing a combination structure of the third and fourth internal electrodes and the first and second external electrodes of FIG. 10.

Referring to FIGS. 10 to 16, a multilayer ceramic electronic component may include: a ceramic body 110 including dielectric layers 111, and having first and second main surfaces 5 and 6 opposing each other, first and second side surfaces 1 and 2 opposing each other, and first and second end surfaces 3 and 4 opposing each other; a first block (I) including first and second internal electrodes 121 and 122 having overlap regions which form a capacitance part 120 for forming capacitance inside the ceramic body 110 while the overlap regions are exposed to the first and second side surfaces 1 and 2, each of the first internal electrodes 121 having a first lead out portion 121a extended from the capacitance part 120 so as to be exposed to the first and second side surfaces 1 and 2, the second internal electrodes 122 being laminated alternately with the first internal electrodes 121 with the dielectric layers 111 therebetween while being insulated from the first internal electrodes 121, each of the second internal electrodes 122 having a second lead out portion 122a extended from the capacitance part 120 so as to be exposed to the first and second side surfaces 1 and 2; one or more second blocks (II) each including third and fourth internal electrodes 123 and 124 having overlap regions which form a capacitance part 120 for forming capacitance inside the ceramic body 110, each of the third internal electrodes 123 having a third lead out portion 123a extended from the capacitance part 120 so as to be exposed to the first and second side surfaces 1 and 2, the fourth internal electrodes 124 being laminated alternately with the third internal electrodes 123 with the dielectric layers 111 therebetween while being insulated from the third internal electrodes 123, each of the fourth internal electrodes 124 having a fourth lead out portion 124a extended from the capacitance part 120 so as to be exposed to the first and second side surfaces 1 and 2; a first external electrode 131 connected to the first and third lead out portions 121a and 122a and a second external electrode 132 connected to the second and fourth lead out portions 123a and 124a; and an insulating layer 140 formed on the first and second side surfaces 1 and 2 of the ceramic body 110. Here, the second blocks (II) may be disposed above and below the first block (i).

The thickness of the first block (I) may be 20 to 80% the overall thickness of the first and second blocks, on a cross section in a length-thickness (L-T) direction of the ceramic body 110.

The thickness of the second block (II) may be 10 to 40% the overall thickness of the first and second blocks, on the cross section in the length-thickness (L-T) direction of the ceramic body 110.

The first and second internal electrodes may be disposed vertically with respect to a mounting surface of the ceramic body.

The first external electrode may be extended to one or more of the first main surface, the second main surface, and the first end surface of the ceramic body.

The second external electrode may be extended to one or more of the first main surface, the second main surface, and the second end surface of the ceramic body.

The insulating layer may include at least one selected from the group consisting of epoxy, heat-resistant polymer, glass, and ceramic material.

The insulating layer may cover all of exposed portions of the first and second internal electrodes, which overlap each other.

The insulating layer may be lower than the height of the first and second external electrode, measured from the first or second side surface of the ceramic body.

Hereinafter, components different from those of the foregoing embodiment of the invention may be mainly described and detailed descriptions of the same components will be omitted.

According to another embodiment of the invention, the first lead out portion 121a and the second lead out portion 122a may be extended to be exposed to the first and second side surfaces 1 and 2 of the ceramic body 110, but are not limited thereto.

Meanwhile, the first and second internal electrodes 121 and 122 may be spaced apart from the first and second end surfaces 3 and 4 at a predetermined space, respectively.

In addition, according to another embodiment of the invention, the third lead out portion 123a and the fourth lead out portion 124a may be extended to be exposed to the first and second side surfaces 1 and 2 of the ceramic body 110, but are not limited thereto.

Meanwhile, the third and fourth internal electrodes 123 and 122 may be spaced apart from the first and second end surfaces 3 and 4 at a predetermined space, respectively.

The first and second external electrodes 131 and 132 may be connected to the first and third lead out portions 121a and 123a and the second and fourth lead out portions 122a and 124a, respectively, and may be formed on the first and second side surfaces 1 and 2.

That is, the first and second external electrodes 131 and 132 of the multilayer ceramic capacitor according to another embodiment of the invention may be formed on the first side surface 1 and the second side surface 2.

According to another embodiment of the invention, the first lead out portion 121a and the second lead out portion 122a are exposed to the first and second side surfaces 1 and 2 of the ceramic body 110, so that the route for removing residual carbon may be further secured, thereby improving continuity of the internal electrode, and thus there may be an effect of increasing the capacitance.

In addition, as the area of the capacitance part 120, which corresponds to the overlap regions of the first and second internal electrodes, become increased, there may be an effect of increasing the capacitance.

In addition, a short circuits occurring between internal electrodes due to a phenomenon that opposing internal electrodes are pushed by cutting stress at the time of cutting the ceramic body may be prevented.

Meanwhile, according to another embodiment of the invention, the insulating layer 140 may be formed on the first and second side surfaces 1 and 2 of the ceramic body 110, as shown in FIG. 16.

The insulating layer 140 may be formed between the first and second external electrodes 131 and 132.

The insulating layer 140 may cover the first lead out portion 121a exposed to the first and second side surfaces.

According to the embodiment of the present invention, as shown in FIG. 16, the insulating layer 140 may completely fill one surface of the ceramic body 110 between the first and second external electrodes 131 and 132.

In addition, although not shown, according to the embodiment of the present invention, the insulating layer 140 may cover only the first lead out portion 121a while having a predetermined space from the first and second external electrodes 131 and 132.

According to the embodiment of the invention, the height of the insulating layer 140 may be smaller than the height of the first external electrode 131 and the second external electrode 132. The heights of the insulating layer and the first and second external electrodes may be measured based on the mounting surface, that is, the first side surface.

According to the present embodiment, since the height of the insulating layer is smaller than the height of the first and second external electrodes, the multilayer ceramic capacitor 100 may be mounted on the circuit board with more stability.

In addition, the first and second external electrodes 131 and 132 may be formed on portions of the first and second side surfaces 1 and 2 of the ceramic body.

According to the embodiment of the invention, since the overlap regions which form the capacitance part 120 inside the ceramic body 110 are exposed to the first side surface 1 as described above, the capacitance of the multilayer ceramic capacitor 100 may be increased.

In addition, the distance between the first and second internal electrodes to which voltages with different polarities are externally applied becomes closer, resulting in shortening the current loop, so that equivalent series inductance (ESL) may be reduced.

Table 1 below compares capacitance, incidence of short, and frequency of failure, depending on the ratio of the thickness of the first block (I) based on the overall thickness of the first and second blocks, in the multilayer ceramic capacitor according to the embodiment of the invention.

An experiment for measuring the frequency of failure was performed on 100 samples for 48 hours by applying a voltage of 6.3 V under the temperature of 85° C. and relative humidity of 85%.

TABLE 1

|  | Thickness of Block/ (Thickness of +) = 0% | Thickness of Block/ (Thickness of +) = 10% | 20% ≤ Thickness of Block/ (Thickness of +) ≤ 80% | Thickness of Block/ (Thickness of +) = 90% | Thickness of Block/ (Thickness of +) = 100% |
|---|---|---|---|---|---|
| Capacitance (μF) | 7.8 | 8.4 | 9.3~11.5 | 12.4 | 13.1 |
| Incidence of Short (%) | 5 | 8 | 10~20 | 60 | 90 |
| Frequency of Failure | 0/100 | 0/100 | 0/100 | 16/100 | 18/100 |

Referring to Table 1 above, it may be seen that, in the multilayer ceramic capacitor according to the embodiment of the invention, the capacitance is decreased or the incidence of short or the frequency of failure is increased when the sample deviates from the numerical range of the present invention.

Whereas, it may be seen that, when the sample satisfies the numerical range of the present invention, the capacitance is increased and the incidence of short and the frequency of failure are decreased, thereby obtaining excellent reliability.

As set forth above, according to the embodiments of the invention, the first and second internal electrodes are alternately exposed to one side surface of the ceramic body, so that a short circuit occurring between internal electrodes may be prevented.

According to the embodiments of the invention, the overlap regions of the first and second internal electrodes, forming the capacitance part, are increased, so that capacitance of the multilayer ceramic capacitor may be increased.

Further, the distance between the first and second internal electrodes to which voltages with different polarities are externally applied becomes relatively closer, resulting in shortening the current loop, so that equivalent series inductance (ESL) may be reduced.

Further, according to the multilayer ceramic capacitor of one embodiment of the invention, the mounting area thereof on the printed circuit board may be significantly reduced and acoustic noise may be significantly reduced.

While the present invention has been shown and described in connection with the embodiments, it will be apparent to those skilled in the art that modifications and variations may be made without departing from the spirit and scope of the invention as defined by the appended claims.

What is claimed is:

1. A multilayer ceramic electronic component, comprising:
a ceramic body including dielectric layers, and having first and second main surfaces opposing each other, first and second side surfaces opposing each other, and first and second end surfaces opposing each other, wherein the ceramic body includes
a first block including first and second internal electrodes having overlap regions which form a capacitance part for forming capacitance inside the ceramic body while the overlap regions are exposed to the first side surface, each of the first internal electrodes having a first lead out portion extending from the capacitance part so as to be exposed to the first side surface, the second internal electrodes being laminated alternately with the first internal electrodes having the dielectric layers interposed therebetween while being insulated from the first internal electrodes, each of the second internal electrodes having a second lead out portion extending from the capacitance part so as to be exposed to the first side surface, the first lead out portions of the first internal electrodes and the second lead out portions of the second internal electrodes forming a first lead out overlapping region between each other;
one or more second blocks each including third and fourth internal electrodes having overlap regions which form a capacitance part for forming capacitance inside the ceramic body, each of the third internal electrodes having a third lead out portion extending from the capacitance part so as to be exposed to the first side surface, the fourth internal electrodes being laminated alternately with the third internal electrodes having the dielectric layers interposed therebetween while being insulated from the third internal electrodes, each of the fourth internal electrodes having a fourth lead out portion extending from the capacitance part so as to be exposed to the first side surface;
a first external electrode connected to the first and third lead out portions and a second external electrode connected to the second and fourth lead out portions; and an insulating layer formed on the first side surface of the ceramic body, wherein the second blocks are disposed above and below the first block, and wherein the first lead out overlapping region does not have any overlapping area with the third lead out portion and the fourth lead out portion, and has a width more than half of the overall width of the first or second side surfaces in the extending direction of the dielectric layers.

2. The multilayer ceramic electronic component of claim 1, wherein a thickness of the first block is 20 to 80% of an overall thickness of the first and second blocks in a cross section taken in length-thickness directions of the ceramic body.

3. The multilayer ceramic electronic component of claim 1, wherein a thickness of the second block is 10 to 40% based on an overall thickness of the first and second blocks in a cross section taken in length-thickness directions of the ceramic body.

4. The multilayer ceramic electronic component of claim 1, wherein the first to fourth internal electrodes are disposed vertically with respect to a mounting surface of the ceramic body.

5. The multilayer ceramic electronic component of claim 1, wherein the first external electrode extends to at least one of the first main surface, the second main surface, and the second side surface of the ceramic body.

6. The multilayer ceramic electronic component of claim 1, wherein the second external electrode extends to at least one of the first main surface, the second main surface, and the second side surface of the ceramic body.

7. The multilayer ceramic electronic component of claim 1, wherein the insulating layer contains at least one selected from the group consisting of epoxy, a heat-resistant polymer, glass, and a ceramic material.

8. The multilayer ceramic electronic component of claim 1, wherein the insulating layer covers all exposed portions of the first and second internal electrodes.

9. The multilayer ceramic electronic component of claim 1, wherein the insulating layer is lower than a height of the first and second external electrodes, measured from the first side surface of the ceramic body.

10. The multilayer ceramic electronic component of claim 1, wherein the third lead out portion and the fourth lead out portion do not overlap with each other.

11. The multilayer ceramic electronic component of claim 1, wherein length of the first and second lead out portions is larger than length of the third and fourth lead out portions.

12. The multilayer ceramic electronic component of claim 1, wherein the one or more second blocks are two blocks and the first block is disposed between the two second blocks.

13. A multilayer ceramic electronic component, comprising:
a ceramic body including dielectric layers, and having first and second main surfaces opposing each other, first and second side surfaces opposing each other, and first and second end surfaces opposing each other, wherein the ceramic body includes
a first block including first and second internal electrodes having overlap regions which form a capacitance part for forming capacitance inside the ceramic body while the overlap regions are exposed to the first and second side surfaces, each of the first internal electrodes having a first lead out portion extending from the capacitance part so as to be exposed to the first and second side surfaces, the second internal electrodes being laminated alternately with the first internal electrodes having the dielectric layers interposed therebetween while being insulated from the first internal electrodes, each of the second internal electrodes having a second lead out portion extending from the capacitance part so as to be exposed to the first and second side surfaces, the first lead out portions of the first internal electrodes and the second lead out portions of the second internal electrodes forming a first lead out overlapping region between each other;
one or more second blocks each including third and fourth internal electrodes having overlap regions which form a capacitance part for forming capacitance inside the ceramic body, each of the third internal electrodes having a third lead out portion extending from the capacitance part so as to be exposed to the first and second side surfaces, the fourth internal electrodes being laminated alternately with the third internal electrodes having the dielectric layers interposed therebetween while being insulated from the third internal electrodes, each of the fourth internal electrodes having a fourth lead out portion extending from the capacitance part so as to be exposed to the first and second side surfaces;
a first external electrode connected to the first and third lead out portions and a second external electrode connected to the second and fourth lead out portions; and
an insulating layer formed on the first and second side surfaces of the ceramic body,
wherein the second blocks are disposed above and below the first block, the first lead out overlapping region is disposed between the third lead out portion and the fourth lead out portion with a predetermined distance in the extending direction of the dielectric layers, and has a width more than half of the overall width of the first or second side surfaces in the extending direction of the dielectric layers.

14. The multilayer ceramic electronic component of claim 13, wherein a thickness of the first block is 20 to 80% of an overall thickness of the first and second blocks in a cross section taken in length-thickness directions of the ceramic body.

15. The multilayer ceramic electronic component of claim 13, wherein a thickness of the second block is 10 to 40% based on an overall thickness of the first and second blocks in a cross section taken in length-thickness directions of the ceramic body.

16. The multilayer ceramic electronic component of claim 13, wherein the first and second internal electrodes are disposed vertically with respect to a mounting surface of the ceramic body.

17. The multilayer ceramic electronic component of claim 13, wherein the first external electrode is extended to at least one of the first main surface, the second main surface, and the first end surface of the ceramic body.

18. The multilayer ceramic electronic component of claim 13, wherein the second external electrode is extended to at least one of the first main surface, the second main surface, and the second end surface of the ceramic body.

19. The multilayer ceramic electronic component of claim 13, wherein the insulating layer contains at least one selected from the group consisting of epoxy, a heat-resistant polymer, glass, and a ceramic.

20. The multilayer ceramic electronic component of claim 13, wherein the insulating layer covers all exposed portions of the first and second internal electrodes.

21. The multilayer ceramic electronic component of claim 13, wherein the insulating layer is lower than a height of the first and second external electrodes, measured from the first or second side surface of the ceramic body.

22. The multilayer ceramic electronic component of claim 13, wherein the one or more second blocks are two blocks and the first block is disposed between the two second blocks.

23. A multilayer ceramic electronic component, comprising:
- a ceramic body including dielectric layers, and having first and second main surfaces opposing each other, first and second side surfaces opposing each other, and first and second end surfaces opposing each other, wherein the ceramic body includes
- a first block including first and second internal electrodes having overlap regions which form a capacitance part for forming capacitance inside the ceramic body while the overlap regions are exposed to the first side surface, each of the first internal electrodes having a first lead out portion extending from the capacitance part so as to be exposed to the first side surface, the second internal electrodes being laminated alternately with the first internal electrodes having the dielectric layers interposed therebetween while being insulated from the first internal electrodes, each of the second internal electrodes having a second lead out portion extending from the capacitance part so as to be exposed to the first side surface, the first lead out portions of the first internal electrodes and the second lead out portions of the second internal electrodes forming a first lead out overlapping region between each other;
- one or more second blocks each including third and fourth internal electrodes having overlap regions which form a capacitance part for forming capacitance inside the ceramic body, each of the third internal electrodes having a third lead out portion extending from the capacitance part so as to be exposed to the first side surface, the fourth internal electrodes being laminated alternately with the third internal electrodes having the dielectric layers interposed therebetween while being insulated from the third internal electrodes, each of the fourth internal electrodes having a fourth lead out portion extending from the capacitance part so as to be exposed to the first side surface;
- a first external electrode connected to the first and third lead out portions and a second external electrode connected to the second and fourth lead out portions; and
- an insulating layer formed on the first side surface of the ceramic body,
- wherein the second blocks are disposed above and below the first block, and
- wherein the first lead out portions and second lead out portions have a width more than half of the overall width of the first or second side surfaces in the extending direction of the dielectric layers and the third lead out portions and fourth lead out portions have a width less than half of the overall width of the first or second side surfaces in the extending direction of the dielectric layers.

24. The multilayer ceramic electronic component of claim 1, wherein a thickness of the first block is 20 to 80% of an overall thickness of the first and second blocks in a cross section taken in length-thickness directions of the ceramic body.

25. The multilayer ceramic electronic component of claim 1, wherein a thickness of the second block is 10 to 40% based on an overall thickness of the first and second blocks in a cross section taken in length-thickness directions of the ceramic body.

* * * * *